Figure 3:
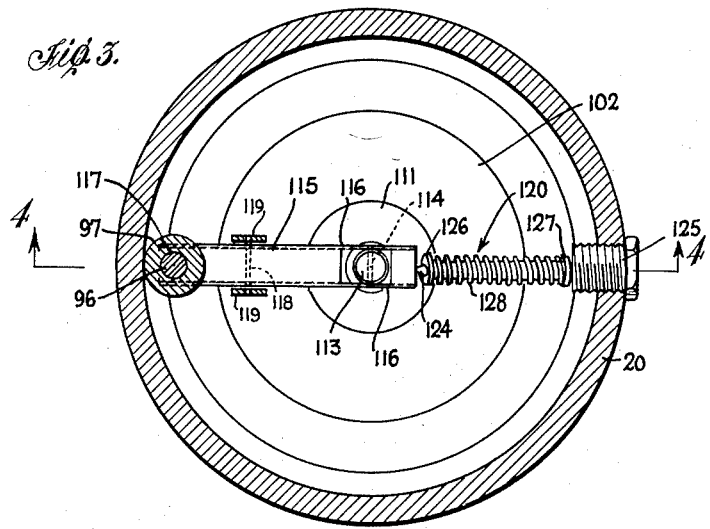

Jan. 22, 1952　　　L. A. WIGGINS　　　2,583,502
BAIL OUT DEMAND REGULATOR
Filed May 23, 1946　　　5 Sheets-Sheet 1
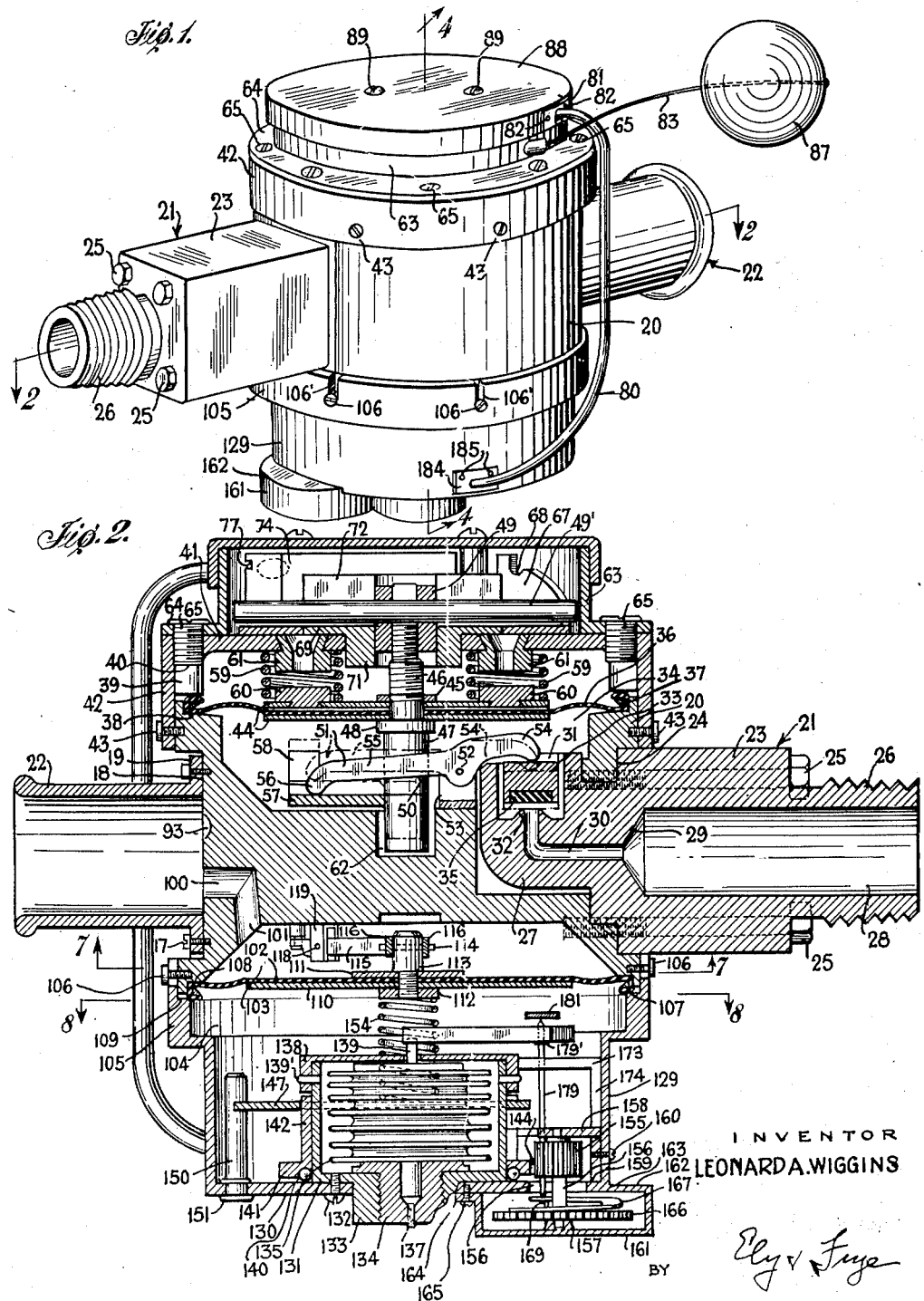
INVENTOR
LEONARD A. WIGGINS
BY Ely & Frye
ATTORNEYS Jan. 22, 1952 L. A. WIGGINS 2,583,502
BAIL OUT DEMAND REGULATOR
Filed May 23, 1946 5 Sheets-Sheet 2

INVENTOR
LEONARD A. WIGGINS
BY
Elyo Frye
ATTORNEYS

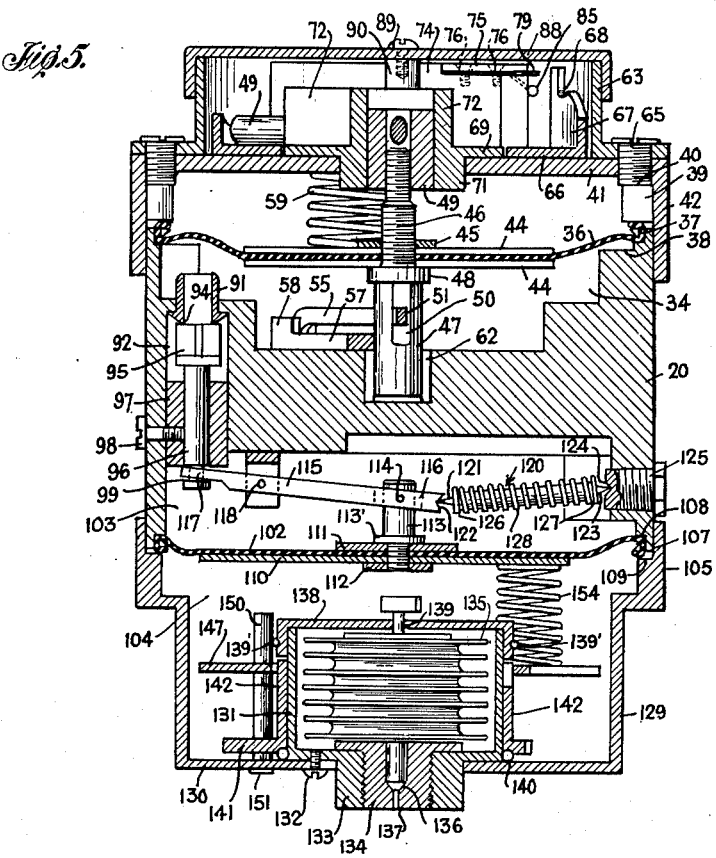

Jan. 22, 1952   L. A. WIGGINS   2,583,502
BAIL OUT DEMAND REGULATOR
Filed May 23, 1946   5 Sheets-Sheet 4
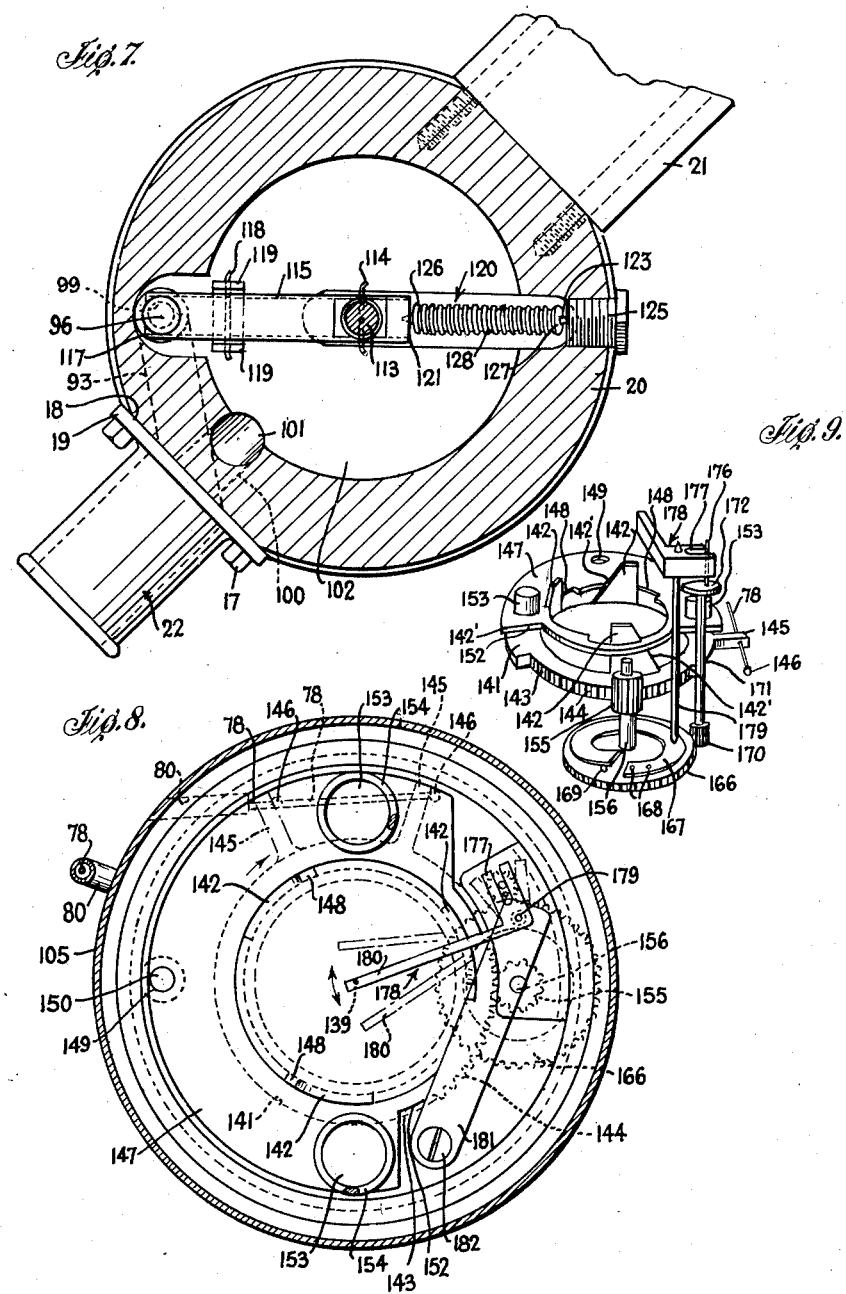
INVENTOR
LEONARD A. WIGGINS
BY Ely T Frye
ATTORNEYS Jan. 22, 1952  L. A. WIGGINS  2,583,502
BAIL OUT DEMAND REGULATOR
Filed May 23, 1946   5 Sheets-Sheet 5

INVENTOR
LEONARD A. WIGGINS
BY
ATTORNEYS

Patented Jan. 22, 1952

2,583,502

UNITED STATES PATENT OFFICE 2,583,502

BAIL OUT DEMAND REGULATOR

Leonard A. Wiggins, Cuyahoga Falls, Ohio

Application May 23, 1946, Serial No. 671,727

13 Claims. (Cl. 128—142)

This invention relates to oxygen demand regulators and more particularly to such regulators of the type used when bailing out of aircraft at high altitudes.

It is now known that a person must not only be furnished with an adequate supply of oxygen when bailing out at high altitudes, but this oxygen must be under suitable pressure at the time the descent is started, and the pressure must be reduced inversely with the increase in atmospheric pressure during descent, while continuing to maintain an adequate supply of oxygen. This is particularly true of the range from 100,000 feet to 30,000 feet if the person is to live.

It is an object of this invention to provide a demand regulator wherein the gas at optimum pressure is furnished for any given altitude, and wherein the pressure is automatically reduced in accordance with the increase in atmospheric pressure during descent.

Another object is to provide novel mechanism for securing the desired gas pressure at the time of bailing out and for properly reducing the gas pressure during descent.

A further object is to provide a regulator having a gas pressure reduction chamber with a valve controlling the entrance of gas therein and novel means for locking and unlocking the valve.

A further object is to provide a regulator having a chamber therein in which a diaphragm is mounted for inward and outward movement in response to differential pressure between the sides thereof and having mechanical means for boosting or speeding up the movement of the diaphragm.

A further object is to provide a regulator having a reduction chamber and a valve controlling passage of gas from said reduction chamber to the user of the regulator, a diaphragm chamber carrying a diaphragm to operate said valve upon inhalation and exhalation of the user, and having novel means providing a toggle action which supplements the operation of said diaphragm and speeds up the operation of said valve.

A further object is to provide a regulator of the character referred to wherein an aneroid is utilized to decrease the pressure of gas furnished the user in accordance with the contraction of said aneroid.

A further object is to provide a regulator wherein energy is stored in spring or equivalent means which is controlled by an aneroid to operate a mechanism that varies the pressure of the gas furnished the user inversely with respect to atmospheric pressure.

Other objects and advantages will become apparent from the following description taken in conjunction with the accompanying drawings.

Figure 4:
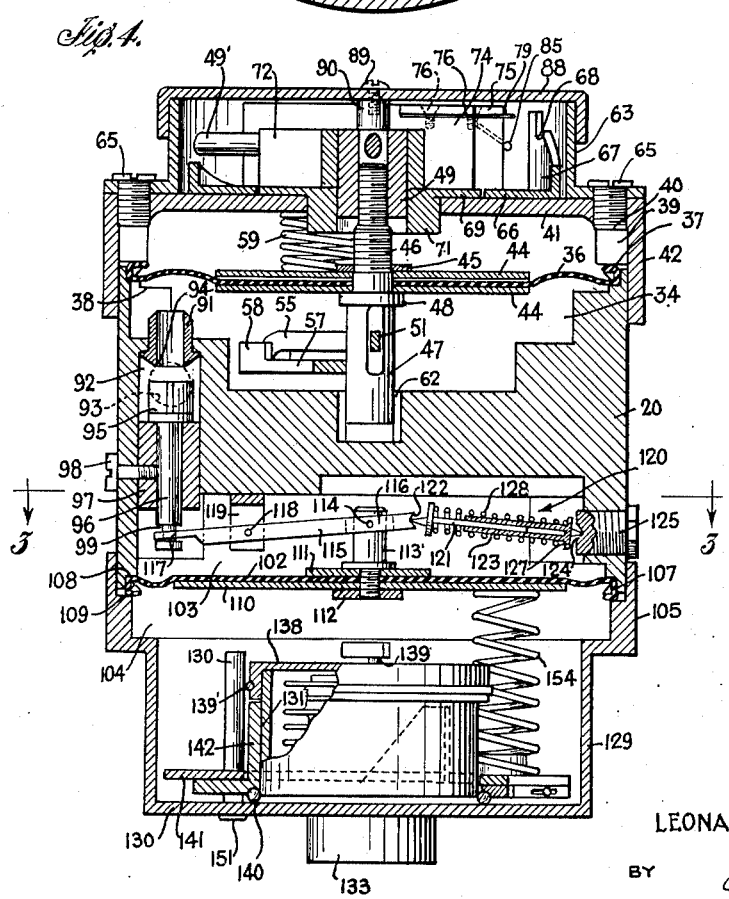
Figure 10:
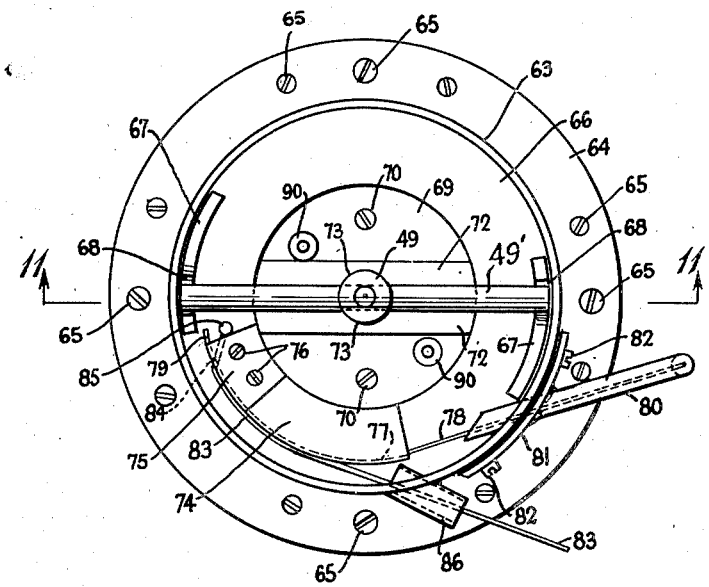
Figure 11:
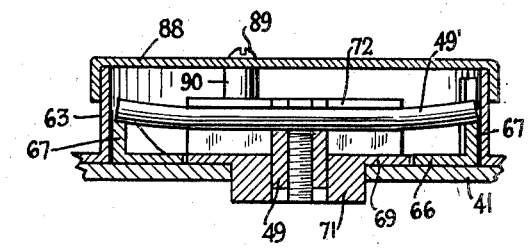
Figure 12:
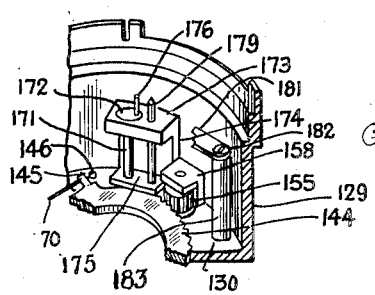

In the drawings:

Fig. 1 is a perspective view of the regulator,

Fig. 2 is a section taken substantially on line 2—2 of Fig. 1, with some parts shown in elevation, this figure being turned approximately 180° with respect to Fig. 1, Fig. 3 is a section taken substantially on line 3—3 of Fig. 4, Fig. 4 is a section taken substantially on line 4—4 of Fig. 1, showing the outlet valve for the reduction chamber in open position with the figure turned at an angle of about 45°, Fig. 5 is a view similar to Fig. 4 showing said valve in closed position, Fig. 6 is a fragmentary section of the lower portion of Fig. 2 showing the cam operating ring in a lower position than in Fig. 2, Fig. 7 is a section taken substantially on line 7—7 of Fig. 2, with the figure turned at an angle of about 45°, Fig. 8 is a similar view taken substantially on line 8—8 of Fig. 2, Fig. 9 is a perspective view of the mechanism for controlling the pressure of the gas passing to the user of the regulator, Fig. 10 is a plan view of the locking mechanism with the cover removed from the top of the regulator, Fig. 11 is a section taken substantially on line 11—11 of Fig. 10, and Fig. 12 is a fragmentary perspective view of part of the closure member showing the position of the bearing brackets with respect to the pressure control mechanism.

Referring to the drawings, the numeral 20 designates an annular housing formed of aluminum or other suitable material having secured thereto at one side, an inlet extension 21 formed of brass or other suitable material through which gas, such as oxygen, passes into the housing, while a tubular outlet extension 22 which may be formed of the same material as the housing, through which the gas passes to the user of the regulator, is secured to the opposite side of the housing. As shown in Figs. 2 and 7, extension 22 has a lateral integral flange 19 on its inner end which engages a flattened area 18 on housing 20 and is secured thereto by screws 17. A conventional oxygen mask (not shown) is adapted to be connected to the outlet extension 22 in the usual manner.

As clearly shown in Fig. 1, extension 21 preferably has a squared central portion 23, the inner face of which fits snugly against a flattened area 24 (Fig. 2) on the outer surface of the housing. Bolts 25 pass through portion 23 and their threaded inner ends are received in the housing to secure the extension tightly thereto. Outwardly of portion 23 the extension is provided with a threaded end 26, to which a supply line (not shown) leading to a source of gas under high pressure (not shown) is adapted to be connected. The inner end 27 of extension 21 is preferably reduced in size and turned upwardly as in Fig. 2.

Extension 21 is provided with a large passage 28 leading from its outer end, which passage is tapered and reduced in size at its inner end, as at 29. The inner end of passage 28 communicates with one end of a smaller passage 30 which turns upwardly and communicates at its upper end with a circular valve chamber 31 formed in the inner end 27 of the extension.

The portion of the extension surrounding the upper end of passage 30 is shaped to provide a valve seat 32 which receives a vertically movable valve 33 mounted in the valve chamber 31. Valve 33 is hexagonal or of any other suitable shape to provide flat sides thereon, so that when the valve is unseated gas can pass upwardly around the sides of the valve and into a reduction chamber 34. Valve 33 is preferably formed of brass or other suitable material and may be provided with a hard rubber base insert 35 which engages the valve seat 32.

The reduction chamber 34 is formed in the upper part of housing 20 and receives a movable diaphragm 36, formed of rubber, rubberized fabric or other suitable material. As shown in Fig. 2, the outer edge of this diaphragm is provided with a preferably triangular bead 37 of conventional material that is tightly clamped between an annular shoulder 38 formed in housing 20, and a clamping ring 39, the upper surface of which bears against a shoulder 40 formed on the inner surface of a cover plate 41 which may be formed of the same material as the housing. The latter plate closes the upper end of chamber 34 and has an integral vertical flange 42 that fits over the upper end of housing 20, being secured to this housing by screws 43 that extend through the flange into the housing.

The greater portion of the central area of diaphragm 36 is provided on both sides with discs 44, formed of Bakelite, aluminum or other suitable material, which are secured to the diaphragm by nut 45 threaded on a reduced portion 46 of a reciprocating metal shaft 47 that passes through the center of the diaphragm and the discs, a collar 48 being formed on shaft 47 so that the diaphragm and discs will be tightly held between collar 48 and nut 45.

At its upper end, shaft 47 is threaded into a vertically movable metal sleeve 49, having an elongated metal locking pin 49' extending through oppositely disposed openings in the sleeve, which will be later referred to, while below collar 48, this shaft has a slot 50 passing therethrough in a direction to receive a metal lever 51 which is pivoted intermediate its ends at 52 to a lug 53 carried by housing 20. Lever 51 is pivoted to provide a short arm 54, which is curved as indicated in Fig. 2 to pass through a vertical slot 54' extending downwardly from the top of the inner end of extension 21, so that the outer end of arm 54 engages the upper surface of valve 33, and a long arm 55 the outer end of which turns downwardly as at 56 to engage the upper surface of a lateral projection 57 formed on shaft 47, which projection has upwardly extending spaced guide portions 58 between which arm 55 extends to prevent side play of the lever during its pivotal movement. The full line position of lever 51 in Fig. 2 is reached when the valve 33 is unseated, and movement of the lever to its broken line position is accomplished by upward movement of shaft 47 and projection 57, as will be later explained.

Between cover plate 41 and the upper disc 44, a plurality of coil springs 59 are arranged. As will be seen from Fig. 2, upper disc 44 is grooved to receive the lower tapered portion of a plurality of circular spring guides 60, one of which is provided for the lower end of each coil spring 59, while cover plate 41 is similarly grooved to receive the upper tapered portion of a plurality of tubular spring guides 61, one of which is provided for the upper end of each spring 59.

Springs 59 have a normal bias tending to urge the diaphragm 36 and shaft 47 downwardly. In Fig. 2, the full line position of the lower end of shaft 47 indicates about the limit of its downward movement, while the broken line position indicates about the limit of its upward movement. To guide the shaft 47 in its movements and to properly center it, the lower end of the shaft operates in a guide sleeve 62 carried by the housing 20. Diaphragm 36 has been shown in Figs. 2 and 5 in about its lower position, but it will be understood that, except for its clamped outer edge, this diaphragm, as well as the other movable parts associated therewith, can move to about the same extent as shaft 47, for example to about the position shown in Fig. 4.

Outwardly of the cover plate 41, an annular cage 63 formed of brass or other suitable material, is arranged and has an integral flange 64 which is secured to the plate 41 by means of screws 65. Some of the screws 65 are long enough to extend through plate 41 to engage the upper surface of clamping ring 39, so that this ring can be forced into tight clamping engagement to hold the bead of diaphragm 36. This cage receives a rotatable cam ring 66 (see Figs. 5, 10 and 11) formed of brass or other suitable material, which carries integral vertical cam members 67 that are provided with small notches 68 at their upper ends, two of these cam members being provided at oppositely disposed locations on ring 66. This ring rotates on the upper surface of the plate 41 and around a hub member 69 which may also be formed of brass that is fixed to plate 41 by means of screws 70 (Fig. 10) or the like. Hub member 69 has an integral central sleeve 71 that extends downwardly through plate 41 and into which the sleeve 49 extends. On its upper surface hub member 69 carries a pair of spaced vertical preferably integral walls 72, between which walls the locking pin 49' is arranged, and these walls are cut away as at 73 (Fig. 10) so as not to interfere with the vertical movement of sleeve 49 which carries pin 49'.

As more clearly shown in Figs. 2, 4, 5 and 10, cam ring 66 carries a vertical arcuate extension 74 having a small clamping plate 75 secured near one end thereof and held thereon by screws 76. In a plane about parallel to the lower surface of plate 75, the outer periphery of extension 74 is provided with a groove 77 that extends from said plate 75 to the other end of the extension. Groove 77 receives a wire 78 or the like that passes under the clamping plate 75 to be held tightly thereby, with the end 79 preferably extending beyond the plate, as in Fig. 10. Wire 78 passes through a tube 80, one end of which passes through a suitable tangential opening in cage 63, being soldered or otherwise secured in a small arcuate plate 81 that is fastened to cage 63 by screws 82, while the opposite end of this tube and wire 78 leads to another part of the regulator to be later described.

Below wire 78, a second wire 83 or the like is arranged to engage the outer periphery of extension 74 in a manner to avoid interference between the two wires. Wire 83 extends in one direction through an opening 84 in extension 74 below the plate 75, and the enlarged inner end 85 of this wire prevents this end of the wire from pulling through the opening. In the other direction wire 83 passes through a small tubular guide 86, soldered or otherwise secured tangentially in the wall of cage 63, and outwardly of the regulator this wire is secured to a relatively large operating knob or ball 87 (Fig. 1). By pulling ball 87 and wire 83, the cam ring 66 may be rotated counter-clockwise from its position in Fig. 10, about a quarter of a revolution. Movement of cam ring 66 will also move wire 78 as will be later explained.

A flanged cover 88 which may also be formed of brass, is provided for cage 63 and is secured thereto by bolts or screws 89 that extend therethrough into a pair of interiorly threaded, oppositely spaced posts 90 that are soldered or otherwised secured vertically on the upper surface of the hub member 69.

The foregoing mechanism carried in cage 63 comprises a locking and unlocking arrangement which initially locks valve 33 to its seat 32 and prevents accidental passage of gas past this valve into the chamber 34. To lock the mechanism, the cover 88 is removed and cam ring 66 is turned manually to its position in Fig. 10. Figs. 10 and 11 show the mechanism locked, and in this position the locking pin 49' has moved up the cams 67 and has its ends extending into the small notches 68 at the upper ends of these cams. When the pin 49' is in locking position with the rotatable cam ring in the position shown in Fig. 10, sleeve 49 which carries pin 49', shaft 47, and diaphragm 36 will all be in their extreme upper positions, while lever 51, due to the action of projection 57, will be in its broken line position in Fig. 2, holding valve 33 tightly against its seat 32. No movement of these locked parts can take place until pin 49' is removed from the notches 68. This locked position is the position in which the regulator will be carried until it is desired to admit gas therein, and in actual use the pin 49' in locked position assumes a slight arcuate shape, which is exaggerated in Fig. 11, for the purpose of emphasis. By yanking wire 83 as previously explained, cam ring 66 will be rotated and the pin 49' will move out of the notches 68 and down the cams 67, so that sleeve 49, shaft 47 and diaphragm 36 will move to their lowest positions, and while arm 54 of lever 51 will still be in engagement with valve 33, projection 57 will be below arm 55 so that there will be no restraint against pivotal movement of this lever to its full line position in Fig. 2.

Thus, when gas under high pressure, usually varying from 50 lbs. to 1800 lbs. per square inch, is admitted through passage 28, this gas will readily unseat valve 33 and pass into the reduction chamber 34, where the gas pressure becomes reduced, for example, to from 5 lbs. to 10 lbs. per square inch. As the gas continues to enter chamber 34, its pressure builds up and will become sufficient to overcome the downward force of springs 59 and atmospheric pressure tending to hold down diaphragm 36, and the latter will be moved upwardly. As diaphragm 36 moves upwardly, shaft 47 also moves upwardly and projection 57 will pivot lever 51 to its broken line position in Fig. 2, seating valve 33. As gas leaves chamber 34, in a manner to be described, the pressure in this chamber will decrease enough to permit downward movement of diaphragm 36 and shaft 47, so that the incoming high pressure gas can again unseat valve 33 and replenish the supply in chamber 34. Hence, in use movement of the diaphragm is almost continuous and in fact, as will be later explained, chamber 34 provides a constant source of gas under relatively low pressure.

Referring now to Figs. 4, 5 and 7, means are provided to control the flow of gas from chamber 34 into the outlet extension 22 from which it passes to the user of the regulator. As shown, a tubular metal insert 91 is force fitted into position in housing 20 between chamber 34 and a valve chamber 92 which communicates by means of a passage 93 (Figs. 2, 4 and 7) with extension 22. The lower end of insert 91 is shaped to provide a valve seat 94 against which a valve 95 is adapted to seat when chamber 34 is out of communication with valve chamber 92. Valve 95 is formed of a hard rubber composition or other suitable material and has an elongated stem 96 movable vertically in an annular guide 97, which is held in housing 20 by a screw 98, while adjacent its lower end, stem 96 is provided with an annular groove 99.

The seating and unseating of valve 95 is controlled by inhalation of the user of the regulator supplemented by a mechanical booster, which in this instance comprises a toggle lever arrangement. Referring to Figs. 2 and 7, housing 20 has a passage 100 leading from extension 22 and being turned at an angle as at 101 so as to communicate with a diaphragm chamber, which is divided by a diaphragm 102 into an inner diaphragm chamber 103 and an outer diaphragm chamber 104. These diaphragm chambers are formed in the lower portion of housing 20 and in a closure member 105 which may be formed of the same material as the housing and which is secured to housing 20 by screws 106 that extend into the housing through vertical slots 106' in the upper end of the closure member. Diaphragm 102 is also formed of rubber, rubberized fabric, or other suitable material, and its outer edge is provided with a preferably triangular bead 107 of conventional material that is suitably clamped between a shoulder 108 formed on housing 20 and a shoulder 109 formed on closure member 105, so as to have ample room for movement of the diaphragm. The slots 106' in the closure member permit vertical adjustment that will insure a tight clamping action on bead 107.

On its lower surface, the greater portion of the central area of the diaphragm 102 is preferably provided with a disc 110, while its upper surface is provided with a smaller disc 111, both of which discs are formed of Bakelite, aluminum or other suitable material, and are secured to the diaphragm by a nut 112 threaded on the reduced end of a small reciprocating metal shaft 113 which passes through the center of the diaphragm and the discs, a collar 113' being formed on shaft 113 so that the diaphragm and discs will be held tightly between collar 113' and nut 112.

Near its upper end, shaft 113 carries a pivot pin 114 which pivotally receives a metal lever 115 which is cut out near one end to provide portions 116 passing on each side of shaft 113, and through which portions the pin 114 extends. After pin 114 is inserted in position its ends are preferably bent, as in Fig. 7, to prevent displacement of the pin. The other end of lever 115 is bifurcated as at 117 to fit in the groove 99 on the valve stem 96, and inwardly of its bifurcated end, lever 115 is pivoted on a pin 118 carried in a pair of spaced guide lugs 119 depending from housing 20.

Cooperating with lever 115 is a spring pressed telescoping metal lever, indicated as a whole by numeral 120 (see Fig. 4), having an arm 121 that is sharply pointed on one end, the point of which is pivotally received in a tapered opening 122 formed in the adjacent end of lever 115. Arm 121 is slidably received within the hollow central portion of a second sharply pointed arm 123, the point of which is pivotally received in a tapered opening 124 formed in the inner end of a set screw 125, threaded into housing 20. A collar 126 is formed on arm 121 near its pointed end, while a similar collar 127 is formed on arm 123, and a coil spring 128 surrounds the telescoping arms between these collars. Spring 128 has a normal bias tending to move the pointed ends of the arms away from each other.

As the user of the regulator inhales, enough of the air or gas within the chamber 103 is withdrawn so that the pressure therein is overcome by the atmospheric pressure (and spring pressure to be later referred to) in chamber 104, and the diaphragm 102 moves inwardly. Fig. 5 shows the diaphragm in about its outermost position and in this position valve 95 is seated against its seat 94. As inhalation causes the diaphragm to move inwardly, it will move shaft 113 in the same direction, and since this shaft is pivoted to lever 115, it will cause the latter to pivot about pin 118, so that the bifurcated end of this lever will move valve stem 96 and valve 95 to unseat the latter and permit gas to pass from chamber 34 to the user. The open position of valve 95 is shown in Fig. 4.

In Fig. 5 it will be observed that the spring pressed telescoping lever 120 tends to resist pivotal movement of lever 115 and consequently upward movement of diaphragm 102, but this resistance is not sufficient to prevent movement of the diaphragm, so that as the latter and shaft 113 move inwardly, the two levers 115 and 120 gradually approach a parallel position, and in so doing, the resistance of lever 120 decreasingly resists movement of the diaphragm. When the two levers reach a parallel position the resistance of lever 120 becomes nil, and as the levers move beyond a parallel position, lever 120 acts to assist further movement of the diaphragm and provides a quick boost to speed up the inward movement of the diaphragm to quickly move it to the position in Fig. 4 and unseat valve 95.

Likewise, when the diaphragm is in the position in Fig. 4, and the pressure in chamber 103 becomes sufficient to move diaphragm 102 outwardly, lever 120 will decreasingly resist movement of the diaphragm until the levers become parallel, at which time this resistance will cease, and further movement of the diaphragm will again be aided by the boosting action of lever 120 to quickly seat valve 95.

The pressure in chamber 103 becomes sufficient to move the diaphragm outwardly after the user stops inhaling and starts to exhale, but the gases of exhalation play no part in providing this pressure, since such gases are intended to be controlled by conventional means carried in the user's mask. Upon completion of the act of inhalation when no more gas is being drawn through outlet 22, the gas in said outlet immediately begins to build up a back pressure which is opposed by the gas of greater pressure entering outlet 22 from chamber 34 while valve 95 is still open. As a consequence, the gas in outlet 22, supplemented by some of the gas still flowing from chamber 34, enters chamber 103 through passage 100, and the pressure of this gas in the latter chamber quickly becomes sufficient to move diaphragm 102 outwardly and close valve 95. Upon the next act of inhalation by the user, the pressure in chamber 103 will again be reduced sufficiently to permit inward movement of diaphragm 102 to again open valve 95. Thus, as the user inhales, the valve 95 is quickly unseated to permit gas to pass to the user during the act of inhalation, while during exhalation the valve will be quickly seated. The toggle booster increases the movement of the diaphragm in each direction and provides a faster opening and closing of the valve 95 than would otherwise be obtained.

The mechanism which has already been described constitutes a suitable demand regulator for use at any selected height, but since a bailout regulator must be used at constantly decreasing heights, provision must be made to reduce the pressure of the gas passing to the user in accordance with the descent. The following mechanism will control the gas pressure as required by the user so that this regulator will be suitable for bail-out purposes.

It will be noted that closure member 105 has a reduced lower portion 129 provided with an integral bottom 130, which portion carries a concentric container 131 formed of brass or other suitable material secured to the bottom 130, as by screws 132. Container 131 has an integral lower portion 133 that extends below bottom 130 and is interiorly threaded to receive the threaded base 134 of a conventional aneroid 135 that operates in the usual manner in container 131, and is well understood in this art. Aneroid 135 may be evacuated in the customary manner through an opening 136 formed in the base, 134, which opening may then be closed by soldering, as at 137. A cover 138 formed of brass or other suitable material is arranged over the top of container 131 and has a central opening through which extends a pin 139 carried in the upper end of and movable with the aneroid 135. A spring wire locking member 139' for cover 138 is arranged half way around this cover and has its ends extending through this cover and the vertical wall of container 131, as shown in Figs. 2 and 6.

Mounted for limited rotation around container 131 on ball bearing 140, is a cam ring 141 (see Figs. 8 and 9), also formed of brass or other suitable material, having a plurality of integral vertical cams 142 spaced adjacent the inner periphery of the ring. In this instance three of the cams 142 are provided, but the number may be changed as desired, and each cam has a slanting surface 142', in this instance arranged at an angle of about 45°. As more clearly shown in Fig. 9, a segment of ring 141 is reduced in width as at 143 and the outer periphery of this segment is provided with gear teeth 144 over a substantial portion of the segment. Adjacent one end of the segment the ring is provided with an integral radial lug 145 having an opening therein through which the wire 78 extends, the end of the latter being enlarged as at 146 so as not to pass through the opening in the lug.

Cooperating with the cams 142 is a vertically movable cam operating ring 147 formed of brass or other suitable material having a plurality of notches 148 on its inner periphery, one for each cam, which notches are about as long as the bases of cams 142. As will appear more clearly from Figs. 8 and 9, notches 148 are in alignment with cams 142, and as the operating ring 147 moves downward from its upper position (shown in Figs. 2 and 5), one side edge of each notch is in contact with the slanting edge 142' of its cooperating cam, causing the latter to turn and rotate the cam ring 141. To prevent any possible rotation of the operating ring 147 during its vertical movement, it is provided with a small opening 149 that receives a guide or centering pin 150 fixed vertically adjacent the wall of closure member 105 and held in the bottom 130 as at 151. A segment of the operating ring 147 is also reduced in width, as indicated at 152, to avoid interference with parts of the mechanism to be described, and adjacent this reduced segment, the upper surface of this ring carries a pair of oppositely spaced spring guides 153 that receive the lower end portions of a pair of coil springs 154, the upper ends of which are in engagement with disc 110 carried by the diaphragm 102, near the outer edge of said disc.

Coil springs 154 are normally biased to move the diaphram 102 and ring 147 away from each other, and these springs furnish the force for moving the operating ring 147 downwardly, but the downward movement of the latter is seldom, if ever, continuous, being controlled and regulated by other mechanism which will be described. While coil springs 154 exert force against diaphram 102 and assist the atmospheric pressure in chamber 104 to move this diaphram inwardly upon inhalation by the user of the device, these springs are not strong enough to prevent outward movement of the diaphram in response to sufficient pressure within the chamber 103.

Referring now to Figs. 2, 6, 8, and 9, the teeth 144 on cam ring 141 are in mesh with the teeth of a pinion 155 secured on a stub shaft 156 that extends through an enlarged opening 156' in bottom 130, being journaled at its lower end in a bearing 157, and at its upper end in a bearing bracket 158 (Figs. 2, 6 and 12) having a depending portion 159 engaging the bottom 130 and the wall 129 so that this bracket may be secured to the latter by a screw 160. Bearing 157 is formed on the inner surface of the bottom of a small housing 161, formed of brass or other suitable material, that constitutes an extension of the closure member 105 and utilizes the bottom 130 as part of its cover, except where it projects beyond the bottom 130 where it has an integral cover 162 that snugly engages the outer surface of bottom 130, as at 163. A portion of housing 161 is provided with an integral flange 164 that receives a plurality of screws 165 (Fig. 2) for securing the housing 161 tightly to the bottom 130.

Inwardly of housing 161, shaft 156 has secured thereto a gear 166 that carries a circular cam track 167 on its upper surface, which track is secured thereto at its lower end by screws 168. Cam track 167 is preferably formed of a split circular piece of metal, such as alloy steel, which may be shaped so that one end is against the upper surface of gear 166 while the track gradually rises until its other end is approximately as shown in Figs. 2, 6 and 9, with its upper end being supported on a pin 169. If desired, intermediate support for the track may be furnished by other pins similar to but shorter than pin 169.

The teeth on gear 166 are in mesh with the teeth of a pinion 170 secured on the lower end of an elongated shaft 171, the upper end of which is enlarged and flattened as at 172 so as to fit in an enlarged opening in the upper projection 173 of a bearing bracket 174 formed integral with but extending above and beyond the bracket 158 (Fig. 12.) Bearing bracket 174 also has a lower projection 175, spaced from its upper projection and in engagement with the inner surface of bottom 130, which lower projection also provides a bearing for shaft 171. The flattened upper end of shaft 171 carries an eccentrically mounted vertical pin 176 that is received in the bifurcated end 177 of a bell crank lever 178 pivotally mounted on the upper end of an elongated pin 179 which extends through projections 173 and 175 on bracket 174 and has its lower end resting on the cam track 167. A collar 179' (Figs. 2 and 6) carried below the upper end of pin 179 forms a support for lever 178. Lever 178 has an elongated arm 180 that extends in the direction of pin 139 carried in the top of the aneroid 135. When shaft 171 is rotated, the eccentric pin 176 will oscillate lever 178 and cause its arm 180 to pass back and forth across the top of pin 139 when the latter is out of the path of arm 180. But when pin 139 is in the path of movement of arm 180, the latter will strike the side of pin 139 and further movement of said arm is prevented. This will be more fully explained in the description of the operation of the device. A flat spring 181 (Figs. 2, 6 and 8) has one end pressing downwardly against the upper pointed end of pin 179, while the other end of said spring is secured by a screw 182 (Fig. 8) to the upper end of a vertical post 183 (Fig. 12) extending from the bottom 130.

Referring to Figs. 1 and 8 it will be noted that the tube 80 which carries the wire 78 has its lower end passing through a suitable tangential opening in the lower end of closure member 105, being soldered or otherwise secured in a small arcuate plate 184, similar to plate 81, that is secured to the closure member by screws 185. As previously explained, cam ring 66 is manually rotated to the position in Fig. 10 to bring the pin 49' into locking position. Movement of cam ring 66 also pulls wire 78 through tube 80 and since the lower end of wire 78 extends through the radial lug 145 on cam ring 141, the latter ring will be rotated to the dot and dash line position of lug 145, indicated to the left in Fig. 8. When the lug 145 is in the latter position, the cam operating ring 147 is in its upper position indicated in Figs. 2 and 5, which is the position in which the ring is carried when the regulator is not in use, and from which position it cannot be moved as long as wire 78 is restraining movement of ring 141. At this time the lower end of pin 179 is adjacent the upper end of cam track 167, as in Fig. 2.

With the regulator in its locked and inoperative position, and with extension 21 connected to a suitable portable source of oxygen under high pressure, we will assume the device is carried by a user ready to bail out of an aircraft at a height above 20,000 feet. Just prior to jumping the user will yank ball 87 and pull cord 83 which rotates cam ring 66 to unlock the valve 33 and permit gas to enter chamber 34. Rotation of cam ring 66, counter-clockwise as viewed in Fig. 10, will push wire 78 through tube 80 and the end of this wire will be moved from its left to its right position in Fig. 8, which movement will release the restraint on the rotation of cam ring 141. Since the atmospheric pressure is lowest at the point of the bail-out, the gas furnished the user at the start of the jump must be at a higher pressure than at any other height in the descent. In this regulator the aneroid 135 will be expanded at the start of the jump in accordance with the atmospheric pressure, and the gas will be at a pressure suitable for the user to inhale at that altitude.

Heretofore, in bail-out demand regulators, no proper control was exercised over the pressure of the gas furnished the user, and after falling several thousand feet, the user was still getting gas at about the same pressure it was at the start, whereas, the gas pressure should be reduced during the descent to compensate for the increase in atmospheric pressure that occurs during descent.

With this regulator, as the user descends, the springs 154 exert a force tending to move the cam operating ring 147 downwardly, which movement is opposed by the gear and pinion train except when the pin 139 is below lever arm 180 and does not interfere with its oscillation. When pin 139 is below lever arm 180, downward movement of ring 147 causes the cam ring 141 to rotate as previously described. Rotation of ring 141, through pinion 155, will rotate gear 166 and the cam track 167, while rotation of gear 166 will rotate pinion 170 and move the eccentric pin 176, causing it to oscillate the lever 178. During rotation of gear 166 the pin 179 will be gradually moving down the cam track 167 aided by the flat spring 181 pressing against the upper end of the pin, and since lever 178 is carried on the upper end of this pin, this lever will be lowered with the pin.

Pin 139 is carried in the top of aneroid 135 and at the start of the jump its upper end will be in the path of oscillation of arm 180 so that operating ring 147 is initially restrained in its downward movement. As the air pressure increases during descent, the aneroid contracts, thus moving pin 139 downwardly. Hence, pin 139 will drop below the path of movement of lever arm 180 and ring 147 can move downwardly, moving the various parts as previously explained, until lever 178 has been lowered to the point where its arm 180 catches up with pin 139 and is again restrained thereby. In use, the movement of lever 178 downwardly, after pin 139 has moved downwardly, is practically instantaneous and usually only about one-half of an oscillation of lever 178 takes place before it is again restrained by pin 139. As aneroid 135 continues to contract and move pin 139 downwardly, arm 180 will be released periodically and ring 147 can continue to move downwardly during the periods it is released. Eventually ring 147 will reach its lowest position, shown in Figs. 4 and 6, at which time cam ring 141 will have completed its rotation, having moved about the distance indicated in Fig. 8, between the left and right illustration of the lug 145, so that the latter is then in the dash line position at the right in Fig. 8, in contact again with the end 146 of wire 78.

The slope of cam track 167 controls the extent of downward movement of pin 179 and lever 178 each time gear 166 rotates, so that by changing the slope of cam track 167 to a steeper or lesser incline for pin 179 to move down, it will be obvious that the distance to be traveled by this pin and lever 178 may be increased or decreased as desired. Thus, as medical science determines what gas pressure is desirable for any given height, movement of the operating ring 147 may be adjusted to insure passage of gas under proper pressure to the user with this regulator, at all altitudes within the range of the regulator.

The critical pressure area in jumping from aircraft is generally considered to be between 100,000 feet and 22,000 feet, but if the jumper can drop safely to 30,000 feet, the pressure of the gas supplied thereafter is not much of a factor and pressure control is not so important. The present regulator is intended primarily to change gas pressures during the drop, say from 50,000 feet to 30,000 feet, or a distance of about 20,000 feet, and the movement of the pressure control mechanism is usually substantially completed within that distance, but the principles of operation are not necessarily confined to these exact heights or distance. Stated another way, the user will have fallen about 20,000 feet during the time the cam ring 141 has moved the distance indicated by the two positions of the lug 145 in Fig. 8.

Reviewing briefly some of the features in order that the complete operation of the regulator will be fully explained, it will be observed that after the gas has initially entered chamber 34 its pressure will be substantially reduced below what it was at the source of supply, but as gas fills chamber 34 its pressure will quickly build up enough to move diaphragm 36 outwardly and close valve 33, so that no more than enough pressure to move the diaphragm is allowed to build up in chamber 34. However, at any time the pressure in chamber 34 is insufficient to close valve 33, additional gas will enter the chamber until the valve again closes.

With chamber 34 furnishing a constant source of gas under relatively low pressure and with valve 95 closed, the first inhalation by the user draws at least some of the air out of chamber 103 to move diaphragm 102 inwardly and permit gas to pass from chamber 34 through outlet 22 to the user. During the first exhalation, the air which was drawn out of chamber 103 is replaced by enough gas from outlet 22 to move diaphragm 102 outwardly again. Hence, the second inhalation will draw a mixture of gas and air out of chamber 103, while during the second exhalation the drawn out mixture will be replaced with more gas. Thus, as breathing continues, the area comprising chamber 103 and outlet 22 will become filled with gas, at a lower pressure of course than the gas in chamber 34, in which area the pressure is reduced with each inhalation sufficiently to move diaphragm 102 inwardly, and built up again during exhalation to move this diaphragm outwardly.

At the start of the jump, assuming the height to be such that the cam operating ring 147 is in its upper position, (Figs. 2 and 5) the diaphragm 102 may be in either its inner or outer position, with the springs 154 engaging each of these members. Considering first the operation with the diaphragm 102 in its inner position, which will be the position in which it will be found if the regulator is connected to the breathing tube immediately prior to jumping, for the sake of illustration, we will assume that in this position the springs 154 are tensioned to exert a force of about three-fourths of a pound on the outer surface of diaphragm 102, which can be balanced by a force exerted on the inner surface of the diaphragm equivalent to about 12 inches of water pressure. We will assume further that a pressure differential between the sides of this diaphragm equal to about one-half inch of water pressure is sufficient to move the diaphragm.

Since valve 95 is open when diaphragm 102 is in its inner position, and the user is not at that moment breathing through the mask attached to outlet 22, pulling the cord 83 will permit gas to pass into and through chamber 34, into outlet 22, and from the latter into chamber 103, thus building up the pressure in the latter chamber sufficiently to move diaphragm 102 outwardly to close valve 95. To overcome the force of springs 154 the pressure in chamber 103 would have to be increased to the equivalent of about twelve and one-half inches of water pressure. Now, as the user inhales, gas is withdrawn from chamber 103 and the pressure reduced therein so that the diaphragm is moved inwardly by the greater pressure of the springs 154 to again open valve 95. The relative pressures acting between each side of diaphragm 102 would remain as illustrated as long as the force exerted by springs 154 remains the same.

But, as the cam operating ring 147 moves downwardly in response to the contraction of the aneroid 135, it will be obvious that since the lower ends of springs 154 are in engagement with this ring, the force exerted by these springs will be reduced gradually as the user descends. By gradually reducing the force exerted by springs 154 against diaphragm 102, the gas pressure in chamber 103 necessary to move this diaphragm outwardly, would also become gradually reduced. As soon as this gas pressure becomes reduced, the gas pressure in outlet 22 will be similarly gradually reduced, and the gas entering outlet 22 from chamber 34 will gradually drop in pressure in accordance with the decrease in pressure in outlet 22 and chamber 103. Thus, as the user descends, the pressure of the gas furnished is gradually reduced inversely with respect to the increase in atmospheric pressure, since the reduction in gas pressure follows contraction of the aneroid 135 which is directly responsive to increase in atmospheric pressure. It will be observed, therefore, that the energy or force in springs 154 is controlled by the aneroid 135 to operate the mechanism that varies the pressure of the gas furnished the user inversely with respect to the atmospheric pressure.

If the breathing tube has been attached to the regulator, which of course cannot furnish gas until wire 83 is pulled, while the user has been breathing through an interconnected tube (for example, a Y connection) which leads to a different source of oxygen carried by the aircraft, it is possible that enough gas will have passed through the breathing tube into chamber 103 to move diaphragm 102 outwardly, so that at the time of jumping this diaphragm will be in its outer position. This will have no bad effect on the operation of the regulator, since the first inhalation will reduce the pressure in chamber 103 as previously described, and the regulator will function as already explained.

After the cam operating ring 147 has reached the end of its downward movement, no further change in gas pressure can be made with the regulator. If, however, the user has dropped a distance within the working limits of the device, and is at a height no greater than about 30,000 feet when ring 147 is in its lowest position, he can make it safely to the ground because changes in gas pressure are no longer critical below said height, and the device will continue to function to furnish gas even though the pressure can not be further reduced.

After the user has landed, the regulator must be reset before it is used again, and this may be done by removing cover 88 and manually turning cam ring 66 to its position in Fig. 10, which movement will rotate cam ring 141 until lug 145 reaches its left position in Fig. 8, and cause the cam operating ring 147 to ride up cams 142 until it reaches its upper position in Figs. 2 and 5.

While I have illustrated and described the preferred embodiment of my invention, it will be apparent to those skilled in this art, that changes and modifications may be made therein without departing from the spirit of the invention or from the scope of the subjoined claims.

What is claimed is:

1. In a regulator of the character described, the sub-combination of a diaphragm chamber, a diaphragm in said chamber operable by differential pressure between the sides thereof, springs providing at least part of the pressure acting on one side of said diaphragm, and means for decreasing the spring pressure comprising a movable cam operating member against which said springs also exert pressure, a cam member rotatable in response to movement of said operating member, a gear train operable upon rotation of said cam member, an oscillating lever operated by said gear train, a cam track carried on a gear in said train, a pin having one end on said track and its other end pivotally supporting said lever, a second pin in the path of oscillation of said lever, and an aneroid carrying said second pin and moving same in response to contraction of said aneroid.

2. In a bail-out regulator of the character described, the combination of means for supplying gas under a selected pressure at a selected height to the user of the regulator, and means for reducing the pressure of the gas supplied as the user descends inversely with respect to the increase in atmospheric pressure surrounding the user during descent, said last-named means including an aneroid, and mechanism responsive to the contraction of said aneroid including a cam track having a predeterminable cam surface for reducing said gas pressure during descent.

3. In a bail-out regulator of the character described, the combination of means for supplying gas under a selected pressure at a selected height to the user of the regulator, and means for varying the pressure of the gas supplied said user inversely with respect to the increase in atmospheric pressure during descent of said user, comprising a diaphragm movable in one direction by the pressure of said gas, spring or equivalent means having energy stored therein for moving said diaphragm in the opposite direction, an aneroid, said energy being released and controlled by said aneroid to vary the pressure of said last-named means on said diaphragm in a predetermined manner, a movable member against which said last-named means exerts pressure in the opposite direction, and mechanism operated by said movable member for controlling the pressure exerted against said movable member by said last-named means, said mechanism being controlled by contraction of said aneroid.

4. In a bail-out regulator of the character described, the combination of a chamber for supplying gas under a selected pressure at a selected height to the user of the regulator, a diaphragm chamber, a diaphragm in said chamber operable by differential pressure between the sides thereof during inhalation and exhalation to control the amount of gas supplied to the user from said first chamber during descent, and means for reducing the force acting against one side of said diaphragm as the user descends, said reduction of force being inverse with respect to the increase in atmospheric pressure surrounding the user during descent, said means including an aneroid, and mechanism responsive to the contraction of said aneroid including a cam track having a predeterminable cam surface for reducing the force acting against one side of said diaphragm during descent.

5. In a bail-out regulator of the character described, the combination of a chamber for supplying gas under a selected pressure at a selected height to the user of the regulator, a diaphragm chamber, a diaphragm in said chamber operable by differential pressure between the sides thereof during inhalation and exhalation to control the amount of gas supplied to the user from said first chamber during descent, and means for reducing the force acting against one side of said diaphragm as the user descends inversely with respect to the increase in atmospheric pressure surrounding the user during descent, said means comprising a movable member against which said force also acts, an aneroid, and mechanism operated by said movable member for controlling said force acting against said movable member, said mechanism being controlled by contraction of said aneroid.

6. In a bail-out regulator of the character described, the combination of a chamber for supplying gas under a selected pressure at a selected height to the user of the regulator, a valve controlling the passage of said gas from said chamber to the user, a diaphragm chamber, a diaphragm in said chamber operable by differential pressure between the sides thereof during inhalation and exhalation to operate said valve during descent, springs providing at least part of the pressure acting on one side of said diaphragm, and means for decreasing the spring pressure as the user descends with respect to the increase in atmospheric pressure surrounding the user during descent, said means including an aneroid, and mechanism responsive to the contraction of said aneroid during descent including a cam track having a predeterminable cam surface for decreasing said spring pressure.

7. In a regulator of the character described, the combination of a chamber for supplying gas under a selected pressure at a selected height to the user of the regulator, a diaphragm chamber, a diaphragm in said chamber operable by differential pressure between the sides thereof during inhalation and exhalation to control the amount of gas supplied to the user from said first chamber during descent, springs providing at least part of the pressure acting on one side of said diaphragm, means for decreasing the spring pressure as the user descends comprising a movable cam operating member against which said springs also exert pressure, and means for intermittently stopping movement of said cam operating member comprising a cam member rotatable in response to movement of said cam operating member, a gear train operable upon rotation of said cam member, an oscillating lever operated by said gear train, a cam track carried on a gear in said train, a pin having its lower end on said track and its upper end pivotally supporting said lever, a second pin in the path of oscillation of said lever, and an aneroid carrying said second pin and moving same in response to contraction of said aneroid.

8. In a bail-out regulator of the character described, the combination of means for supplying gas under a selected pressure at a selected height to the user of the regulator, and means for varying the pressure of the gas supplied said user inversely with respect to the increase in atmospheric pressure during descent of said user, comprising a diaphragm movable in one direction by the pressure of said gas, spring or equivalent means having energy stored therein for moving said diaphragm in the opposite direction, an aneroid, said energy being released and controlled by said aneroid to vary the pressure of said last-named means on said diaphragm in a predetermined manner, a movable member against which said last-named means exerts pressure in the opposite direction, a cam member operated by said movable member, and mechanism operated by said cam member and controlled by contraction of said aneroid.

9. In a bail-out regulator of the character described, the combination of a chamber for supplying gas under a selected pressure at a selected height to the user of the regulator, a diaphragm chamber, a diaphragm in said chamber operable by differential pressure between the sides thereof during inhalation and exhalation to control the amount of gas supplied to the user from said first chamber during descent, and means for reducing the force acting against one side of said diaphragm as the user descends inversely with respect to the increase in atmospheric pressure surrounding the user during descent, said means comprising a movable member against which said force also acts, an aneroid, a cam member operated by said movable member, and mechanism operated by said cam member and controlled by contraction of said aneroid.

10. In a regulator of the character described, the combination of a chamber for supplying gas under a selected pressure at a selected height to the user of the regulator, a diaphragm chamber, a diaphragm in said chamber operable by differential pressure between the sides thereof during inhalation and exhalation to control the amount of gas supplied to the user from said first chamber during descent, springs providing at least part of the pressure acting on one side of said diaphragm, and means for decreasing the spring pressure as the user descends comprising a movable member against which said springs also exert pressure, an aneroid, a cam member operated by said movable member, and mechanism operated by said cam member and controlled by contraction of said aneroid.

11. In a regulator of the character described, the sub-combination of a chamber for receiving gas under pressure, a diaphragm in said chamber, a shaft carried by said diaphragm, a valve controlling the entrance of gas into said chamber, a lever pivoted in said chamber with one end thereof engaging said valve, the opposite end of said lever being movable by said shaft to pivot said lever and cause it to lock said valve, and means for moving said shaft, said means comprising a rotatable cam member, oppositely disposed cams on said member, and a pin operatively connected to said shaft and movable on the surfaces of said cams upon rotation of said cam member.

12. In a regulator of the character described, the sub-combination of a chamber for receiving gas under pressure, a diaphragm in said chamber, a shaft carried by said diaphragm, a valve controlling the entrance of gas into said chamber, a lever pivoted in said chamber with one end thereof engaging said valve, the opposite end of said lever being movable by said shaft to pivot said lever and cause it to lock said valve, means for moving said shaft, and means for locking said shaft after it has been moved, said first named means comprising a rotatable cam member, oppositely disposed cams on said member, and a pin operatively connected to said shaft and movable on the surfaces of said cams upon rotation of said cam member, said last named means including said pin and a slot in each of said cams in which the ends of said pin are received.

13. In a regulator of the character described the combination of a chamber for receiving gas under pressure, a valve controlling the passage of gas into said chamber, means for locking said valve, an outlet for gas in said chamber, means for controlling the pressure of gas in said outlet, a connection between said first and second means whereby when said valve is locked said last named means is inoperative, but is rendered operative upon unlocking said valve, and manually operated means for unlocking said valve, said connection comprising a wire or the like, said last named means comprising a wire or the like connected at one end to said valve locking means with its opposite end extending outwardly of the regulator for grasping by the user of the regulator.

LEONARD A. WIGGINS.

REFERENCES CITED

The following references are of record in the file of this patent:

UNITED STATES PATENTS

| Number | Name | Date |
| --- | --- | --- |
| 538,502 | Byrne | Apr. 30, 1895 |
| 561,453 | Thayer | June 2, 1896 |
| 1,320,451 | Dalen | Nov. 4, 1919 |
| 1,492,565 | Karlson | May 6, 1924 |
| 1,953,433 | Replogle | Apr. 13, 1934 |
| 2,223,570 | McMillan | Dec. 3, 1940 |
| 2,308,124 | Stettner | Jan. 12, 1943 |
| 2,324,389 | Heidbrink | July 13, 1943 |
| 2,329,289 | Morehouse | Sept. 14, 1943 |
| 2,391,877 | Cahan | Jan. 1, 1946 |
| 2,408,136 | Fox | Sept. 24, 1946 |

FOREIGN PATENTS

| Number | Country | Date |
| --- | --- | --- |
| 5,115 | France | Oct. 30, 1905 |
| | (1st addition to No. 345,424) | |